Nov. 4, 1958  P. F. GEORGE  2,859,265
PRIMARY CELL
Filed March 15, 1956
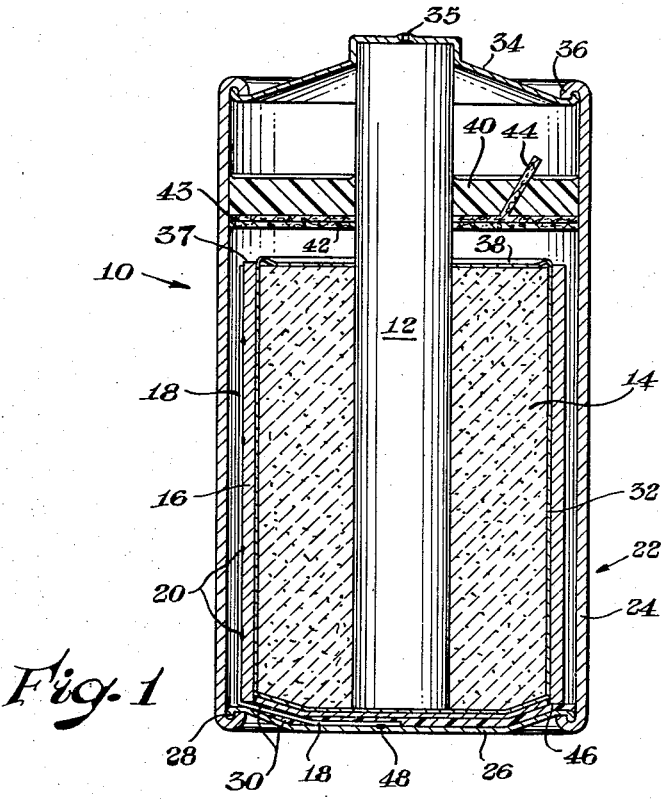
Fig. 1
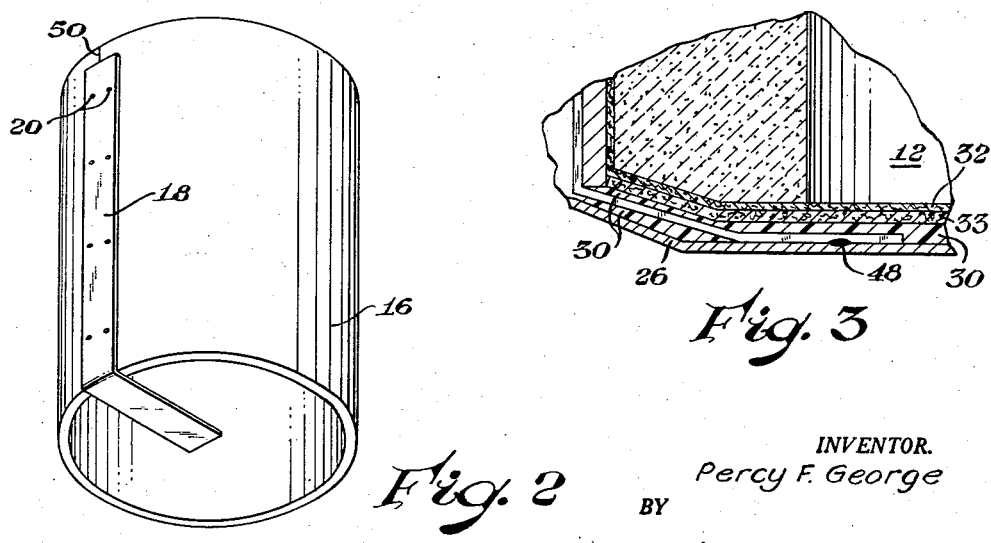
Fig. 2
Fig. 3
INVENTOR.
Percy F. George
BY
Griswold & Burdick
ATTORNEYS

United States Patent Office 2,859,265
Patented Nov. 4, 1958

2,859,265
PRIMARY CELL

Percy F. George, Midland, Mich., assignor to The Dow Chemical Company, Midland, Mich., a corporation of Delaware Application March 15, 1956, Serial No. 571,809

9 Claims. (Cl. 136—100)

This invention relates to an improved primary cell of the dry or non-spillable type, and particularly to dry cells in which the anode material is magnesium.

Dry cell formulations employing magnesium as the anode material are disclosed in a paper by R. C. Kirk and A. B. Fry, "Magnesium Dry Cells," published in the Journal of the Electromechanical Society, vol. 94, No. 6, pages 277 to 289, inclusive.

In making up magnesium primary cells, as mentioned in U. S. Patent No. 2,616,940, "the usual procedure is to form the anode material into a cup or 'battery can' which constitutes one of the electrodes of the cell as well as the container holding the cathode elements and the electrolyte." The cathode mix consists of manganese dioxide having intimately mixed with it usually between about 5 and 15 percent of finely divided carbon, such as acetylene black, by weight. The mixture is moistened with enough electrolyte to make it moldable and the moldable mixture is formed into "bobbins" around a central electrode in the form of a rod of carbon or graphite. These bobbins are usually cylindrical moldings somewhat smaller than the battery can and are inserted into the cans after the cans are lined with starch paste or gelled electrolyte or a porous nonconductor, such as cloth or paper, to keep the bobbin from touching the can. In some instances the cathode mix is introduced into the lined cans without previously forming the cathode mix into a bobbin, the molding taking place in the lined can. In such instances, after placing the cathode mix in the can the carbon or graphite rod is pushed centrally into the cathode mix as the other electrode.

Similar dry cells formulations are disclosed in U. S. Patents 2,547,907 and 2,547,908. U. S. Patent 2,616,940 discloses that in the cells having the foregoing formulations the lining may be dispensed with and the cathode mix may be placed directly against the inside of the can or cup in assembling the cell elements.

Dry cells formulated as above described (with or without lining the can) are usually sealed at the top. Sealing is accomplished by placing a cardboard or similar porous dielectric washer in the top of the can over the end of the carbon rod a short distance above the cathode mix. Then a layer of sealing compound, such as a rosin-base sealing wax, coal tar, or asphalt pitch, is poured over the washer so as to fill the annular space at the top of the can above the washer.

While dry cells made in the above described manner give excellent performance, occasionally such cells would bulge during usage due to the formation of magnesium hydroxide as the cell was discharged. Such bulged cells often prove difficult to remove from the container (usually a flashlight) in which they are used.

Further, the use of magnesium as the cup or battery can is wasteful of magnesium, since a heavier magnesium can must be provided than is needed for consumption as anode material during the life of the cell.

The use of magnesium as a battery can is further complicated by the fact that such cans are normally made by impact extrusion means, a relatively expensive means of fabricating the magnesium.

To provide a better balance of materials in a primary cell, it has been suggested that a steel can be used as the container of the cell and that a separate magnesium anode, usually made of sheet stock and rolled into tubular form to fit within the steel can, be used. Such an anode is more economical than a cup shaped container type anode in that it may be made of appropriate shape and weight to chemically match the cathode mix and electrolyte which is contained in the cell. Cells of this last mentioned type are disclosed and claimed in copending application, Serial No. 527,004, filed August 8, 1955, entitled "Magnesium Anode Primary Cell."

However, dry cells having a sheet magnesium anode which is in contact with the steel can of the cell sometimes split the steel can because of the volume of magnesium hydroxide formed as the anode is consumed. Then, too, when metal battery cans are used electrical insulation must be provided between the side of the cell and the flashlight in which it is used in order to prevent the shorting out of the battery cells when the cells are connected in series.

In addition, the steel cans used in making the above described cells are more expensive than is desirable, especially when taking into consideration that the metal cell can must be provided with an insulating covering and label for the cell.

Accordingly, a principal object of this invention is to provide an improved, more economical primary cell which is encased in a container having non-metallic side walls which do not bulge as the cell is discharged.

In accordance with this invention there is provided a primary cell having a tubular shaped magnesium anode into which a bobbin containing cathode mix and cathode electrode is fitted.

The assembly of anode and bobbin is fitted into a cell can have an electrically conductive bottom surface to which the anode is electrically connected, as by spot welding, for example. The side of the cell can is made of a material which is electrically non-conductive and which is impermeable to the passage of cell liquid and gases or vapor therein formed. The anode-bobbin assembly is spaced from the wall of the cell can by an amount which allows for the increase in volume of the cathode mix as the cell discharges. The upper or cathode contact end of the cell contains a vapor seal of high melting point asphalt tar, hydrogen venting tab, and a cathode cover plate of suitable form which is sealed to the wall of the can.

The invention, as well as additional objects and advantages thereof, will best be understood when the following detailed description is read in connection with the accompanying drawings, in which:

Fig. 1 is a side elevational view, in section, of a primary cell made in accordance with this invention;

Fig. 2 is an isometric view of an anode assembly adapted to be used in connection with the cell shown in Fig. 1, and Fig. 3 is an enlarged fragmentary sectional view showing the lower part of the cell of Fig. 1 and the manner of attachment of the anode tab to the bottom plate of the cell can.

Referring to the drawings, there is shown a primary cell, indicated generally by the numeral 10, comprising a cathode electrode 12, cathode mix 14 including electrolyte, and a magnesium anode 16 of magnesium sheet material rolled into a tube having a longitudinal seam 50. The adjacent edges of the sheet at the seam 50 are joined by a metal strip 18, commonly steel, which is spot welded thereto as at 20 (in Fig. 2). Alternatively, the anode 16 may, if desired, be made of tubular stock to which is welded a metal strip 18 in the manner described above. The anode 16, cathode mix 14, and cathode 12 are disposed within a can, indicated generally by the numeral 22, which has a vapor proof side wall cover 24 of suitable insulating material and a metal bottom plate 26. The side wall 24 and bottom plate 26 are joined by a rolled-in, vapor resistant seal 28.

The bottom of the interior of the can 22 is coated with an insulating material 30, such as grease, tar, oil or lacquer, in order to better isolate the metal plate 26 from the cathode mix 14 and to enhance the vapor seal 28. The cathode mix 14 is contained in a separator bag 32, as of paper, which fits within the anode 16 and rests on a washer 33 of insulating material such as paper (best seen in Fig. 3), and the insulating material 30 at the bottom of the can 22. The cathode electrode 12, which is a carbon or graphite rod disposed within the cathode mix 14, is axially disposed with respect to the can 22. The lower end of the electrode rod 12 lies against the bottom of the bag 32 and is insulated from the bottom plate 26 of the can or cup 22 by the bag 32, washer 33 and the coating 30 of grease, tar, lacquer, or oil.

The top of the cathode terminal electrode 12 is held in position by a somewhat hat-shaped cover plate 34 whose periphery is sealed to the upper end of the can 22 as by a rolled-in seal 36.

The magnesium anode 16 extends about ⅔ of the length of the can 22 and fits loosely within the can 22.

The cathode mix 14 extends between the carbon rod 12 and the anode 16. The mix 14 is in direct contact with the carbon rod 12 but is separated from direct contact with the anode 16 by the paper bag 32 in which the mix 14 is contained. The cathode mix 14 extends to or near the top 37 of the anode 16, and the upper wall 38 of the paper separator bag 32 is turned in towards the carbon rod 12 to help prevent the spilling of cathode mix 14 directly onto the anode 16.

A tar seal 40 is provided between the carbon rod 12 and the can 22. An apertured paper washer 42 is fitted between the carbon rod 12 and the can 22 to provide the base on which the tar seal 40 is poured. A second apertured washer 43 is disposed on top of the washer 42. A paper tab 44 extending upwardly from the washer 43 through the tar seal 40 provides the means by which gas generated within the cell 10 while current drawn therefrom is vented to the upper portion of the cell which is not sealed in a gas tight manner. Alternatively, the porous carbon rod 12 may be used to vent gases from the cell. In such cases the cover plate 34 usually contains a small aperture 35 adjacent to the rod 12.

A space between the top of the anode 16 and the seal 40 as shown is needed because gases (hydrogen, principally) may be generated within the cell 10 at a faster rate than the rate at which they may be vented through the tab 44. The additional space between the tar seal 40 and the cover plate 34 is provided in order that a specific cell dimension may be maintained, e. g., standard length flashlight cell as established for zinc anode type cells.

Formulations of suitable electrolytes and dry mixes for dry cells having magnesium for the anode material are disclosed in the aforementioned U. S. Patents 2,547,907, 2,547,908, 2,606,940, and paper by Kirk and Fry.

The anode 16 in a specific cell made in accordance with this invention is composed of AZ31A alloy sheet of .030 wall thickness rolled to form a cylinder 1.25 inches in outside diameter and 1.5 inches high. In addition to magnesium, AZ31A alloy contains nominally 3 percent aluminum, 1 percent zinc and about .15 percent calcium.

The side walls 24 may be made of several materials which are vapor resistant but are electrical insulators. Wax impregnated paper, polyethylene, polystyrene or laminated materials such as paper having a vapor barrier film bonded thereto are examples of suitable side wall materials. The vapor barrier may be film of polystyrene, polyethylene, polymers and copolymers of vinylidene chloride, or other suitable plastic films. The anode cylinder 16 fits loosely within the can 22 with the bottom edge 46 of the anode 16 at or near to the bottom 26 of the can 22. As mentioned previously, the anode 16 is spot welded to the bottom 26 of the can 22, as at 48, to provide positive electrical connection therewith. The edges of the anode sheet which are in juxtaposition with each other and welded to the metal strip 18 are brought closely together, the separation if any being .005 inch or less, in order to prevent an excessive amount of electrolyte from passing between the juxtaposed edges (shown as the line 50 in Fig. 2) and being dispersed between the anode 16 and the can or cup 22.

As previously mentioned, the metal (commonly steel) bottom 26 of the can 22, which serves as the anode terminal electrode, is protected from corrosion due to electrolytic action by an insulating coating 30 of oil, tar, grease or lacquer, for example, which extends over the bottom (inside) of the can 22. The bottom of the bag 32 containing the cathode mix and electrolyte 14, and the carbon rod 12 supplements the insulating coating 30 and the washer 33 in preventing electrical contact between the carbon rod 12 and the metal plate 26.

Since the anode 16 fits loosely (about 1/32 inch separation, for example) in the can 22, room is provided between the anode 16 and the wall 24 of the can 22 to permit expansion of the anode-bobbin diameter due to the formation of magnesium hydroxide as the anode 16 is consumed. The above described loose-fitting arrangement of the anode 16 in the can 22 thus prevents cracking of the can 22 as the cell is discharged and provides "leak proof," non-bulging operation of the cell despite the eventual rupturing of the anode 16.

Although the anode is "floating" within the can 22, the weld 48 between the can bottom 26 and the steel strip 18 restricts the movement of the anode-bobbin-cathode structure within the cell 10. Thus, although space is provided for expansion of the anode-bobbin assembly, the restriction of movement of the anode 16 helps prevent undue strain on the wax seal which would result in undue vapor loss in event the wax seal were to be ruptured.

I claim:

1. A primary cell comprising a composite cup of tubular cross sectional configuration, said cup having a metal bottom which is a terminal electrode of said cell and having a side wall of vapor resistant, electrically insulating material, the side wall of said cup being joined to the bottom of the cup by a vapor resistant seal, a hollow, cylindrically shaped magnesium anode of smaller outer diameter than the inner diameter of said cup disposed within said cup and spaced from the side wall of said cup, the lower edge of said anode being disposed at least near to the bottom of said cup, a layer of electrically insulating, vapor resistant material disposed between and adhering to the wall and seal of said cup, an electrical connection between said anode and the bottom of said cup, a carbon cathode electrode disposed in said cup with one end projecting beyond the anode, the cathode electrode being insulated from the bottom of the cup, a cathode depolarizing mixture comprising manganese dioxide and carbon black moistened with an aqueous electrolyte, the mixture being interposed between the cathode electrode and the anode, and a vapor seal extending between the part of said cathode electrode which extends above the anode and the wall of the cup.

2. A primary cell in accordance with claim 1, wherein said side walls are made of vapor resistant paper.

3. A primary cell in accordance with claim 1, wherein said vapor resistant seal is a rolled-in seal.

4. A primary cell comprising a composite cup of tubular cross sectional configuration, said cup having a steel bottom which is a terminal electrode of said cell and having side walls of vapor resistant paper, the side wall of said cup being joined to the bottom of the cup by a vapor resistant rolled seal, a hollow, cylindrically shaped magnesium anode of smaller outer diameter than the inner diameter of said side walls disposed within and in loose fitting relationship with the side wall of said cup, a steel strip, said strip being welded to said anode, a part of said strip extending from said anode and being welded to said steel bottom, the lower edge of said anode being disposed at least near to the bottom of said cup, a layer of electrically insulating, vapor resistant material disposed between and adhering to the wall and seal of said cup, a carbon cathode electrode disposed in said cup with one end projecting beyond the anode, the cathode electrode being insulated from the bottom of the cup, a cathode depolarizing mixture comprising manganese dioxide and carbon black moistened with an aqueous electrolyte, the mixture being interposed between the cathode electrode and the anode, and a vapor seal extending between the part of said cathode electrode which extends above the anode and the wall of the cup.

5. A primary cell in accordance with claim 4, wherein said vapor resistant material is a wax-like material.

6. A primary cell in accordance with claim 4, wherein said cylindrically shaped anode is composed of sheet stock having two opposite edges abutting one another, the steel strip being resistance welded to the sheet material adjacent to both abutting edges thereof.

7. A primary cell in accordance with claim 4, wherein said side walls are composed of polyethylene.

8. A primary cell in accordance with claim 4, wherein said side walls are composed of paper having a film of resinous plastic material bonded thereto.

9. A primary cell in accordance with claim 4, wherein said side walls are composed of polystyrene.

References Cited in the file of this patent

UNITED STATES PATENTS

| | | |
|---|---|---|
| 1,550,188 | Verron | Aug. 18, 1925 |
| 2,079,495 | Deibel | May 4, 1937 |
| 2,392,795 | Anthony et al. | Jan. 8, 1946 |
| 2,399,089 | Anthony | Apr. 23, 1946 |
| 2,410,826 | Lang et al. | Nov. 12, 1946 |
| 2,535,742 | Louzos | Dec. 26, 1950 |
| 2,612,533 | Blake | Sept. 30, 1952 |
| 2,697,738 | Glesner | Dec. 21, 1954 |

UNITED STATES PATENT OFFICE
CERTIFICATE OF CORRECTION

Patent No. 2,859,265

November 4, 1958

Percy F. George

It is hereby certified that error appears in the printed specification of the above numbered patent requiring correction and that the said Letters Patent should read as corrected below.

Column 1, line 21, for "Electromechanical" read -- Electrochemical --; column 2, line 39, for "have" read -- having --.

Signed and sealed this 16th day of June 1959.

(SEAL)
Attest:
KARL H. AXLINE
Attesting Officer

ROBERT C. WATSON
Commissioner of Patents